April 19, 1949. L. ZIMMERMANN 2,467,576
HYDRAULIC SYSTEM UTILIZING FLOW DIVIDERS
Filed Jan. 25, 1945 3 Sheets-Sheet 2

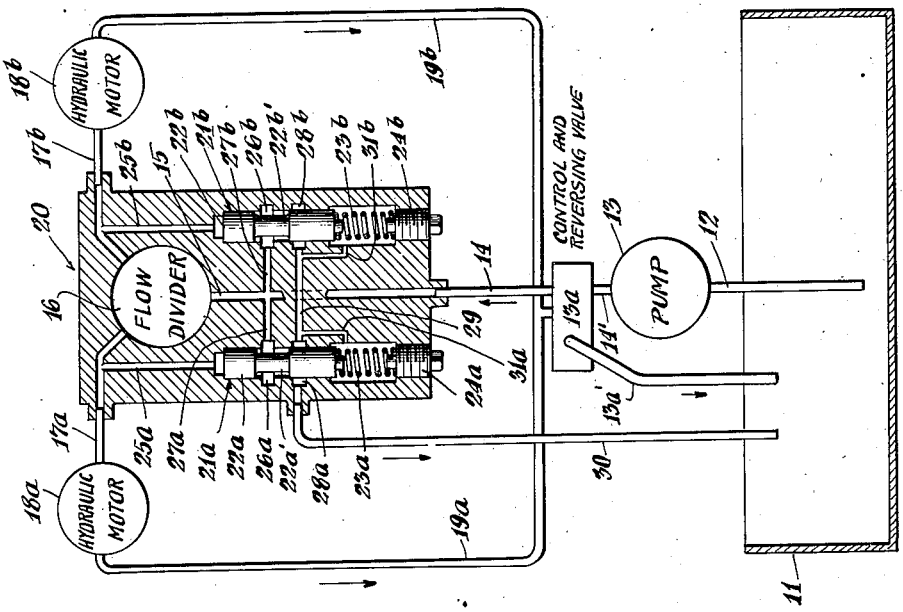

INVENTOR.
Lukas Zimmermann
BY
ATTORNEYS

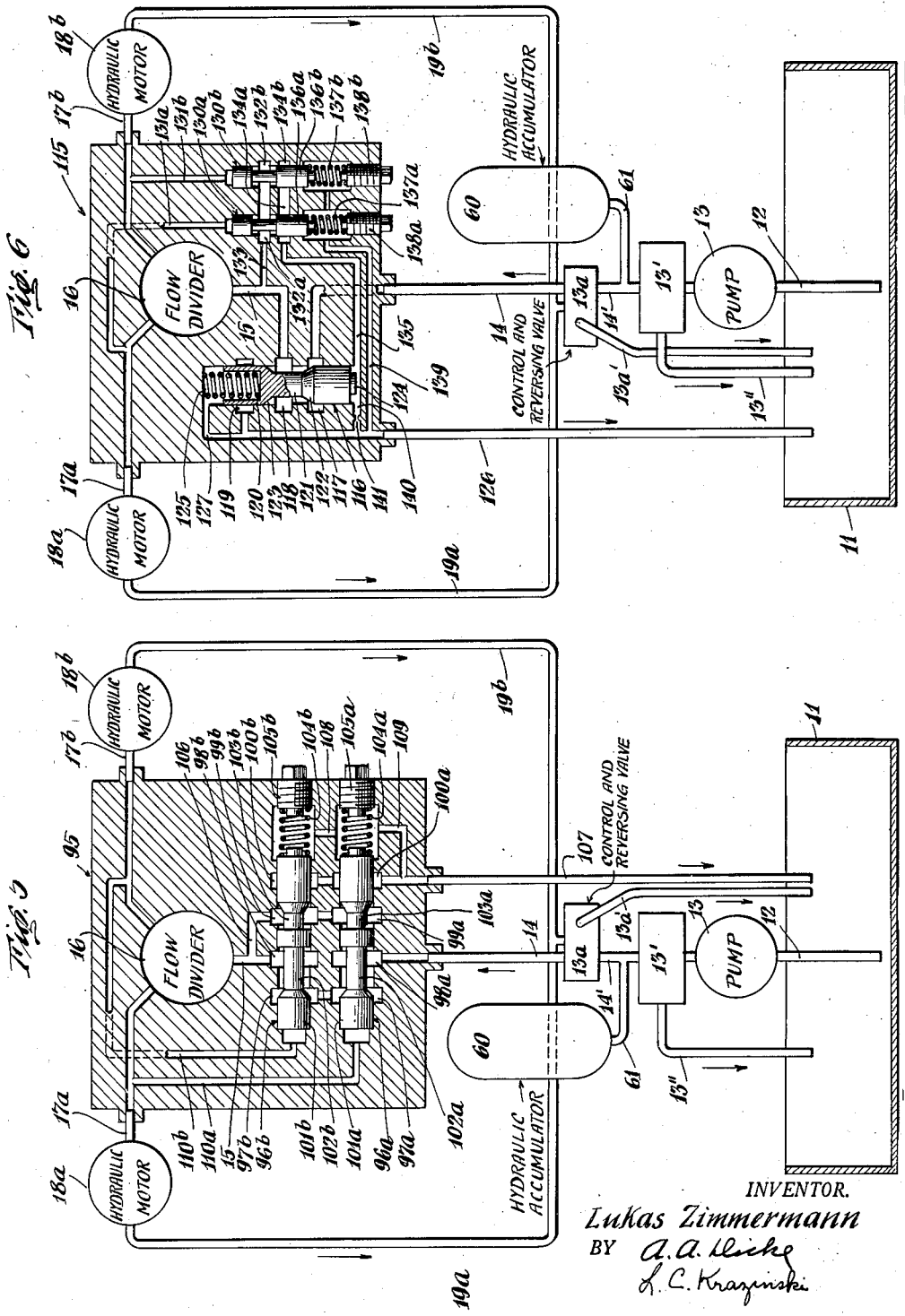

Patented Apr. 19, 1949

2,467,576

UNITED STATES PATENT OFFICE 2,467,576

HYDRAULIC SYSTEM UTILIZING FLOW DIVIDERS

Lukas Zimmermann, Birmingham, Mich.

Application January 25, 1945, Serial No. 574,540

19 Claims. (Cl. 60—97)

This invention relates to improvements in hydraulic systems utilizing flow dividers.

Flow dividers are devices interposed between a source of fluid under pressure, such as a pump, and two or more fluid-utilizing devices, such as hydraulic cylinders, or hydraulic motors which are to be operated in synchronism. Without the use of a flow divider the fluid-utilizing device which operates more freely will operate more rapidly than the other fluid-utilizing device or devices, making synchronism impossible. As examples of flow dividers, reference is made to patent to Methlin 1,573,354, February 16, 1926, patent to Low 2,185,015, patent to Johnson 2,291,578, and to the devices disclosed in applicant's co-pending application Serial Number 518,425 filed January 15, 1944, now Patent No. 2,454,418.

Generally speaking, flow dividers may consist of two or more hydraulic pumps (or hydraulic motors) the rotating elements of which are mechanically connected together, said elements having a common admission conduit connected with a source of fluid under pressure and separate delivery conduits connected to the respective fluid-utilizing devices. Since the elements of the flow divider must rotate together the delivery of fluid to the fluid-utilizing device is, of course, correctly proportioned, irrespective of pressure difference in the divided conduits, (except for leakage in the hydraulic elements). If the delivery of fluid from one of the outlets should be resisted, as when any mechanism operated thereby is jammed, the flow divider will act as a pressure booster and exert a greater pressure upon the conduit leading to the fluid-utilizing device which is most difficult to operate. Thus, in a flow divider having two elements (and two outlets) when one of the outlets is subjected to substantially zero pressure, whereas the other outlet is obstructed, due to resistance against the operation of its fluid-utilizing device, the pressure on the second line will be substantially double the inlet pressure to the flow divider. This is because it receives the direct pressure available in the inlet line to the flow divider and, in addition, the unobstructed element acts as a hydraulic motor and applies a torque to the obstructed element, causing it to operate as a pump and raising the pressure by approximately the amount of the inlet pressure so that this section will deliver approximately double the inlet pressure.

This effect is very important in certain applications, as in applications to retractable airplane landing gear and wing flap operating mechanism, one of which may occasionally get out of order so that it will need additional pressure for its operation. Thus, a flow divider is able to deliver several streams of fluid in predetermined volume proportions at different pressures, some of which may exceed the inlet pressure. The relationship is that the sum of the pressures existing in the outlet lines of a flow divider having any number of sections equals the inlet pressure times the number of sections.

This characteristic of flow dividers while having the above mentioned advantage has the disadvantage that excessive pressure may be developed at certain times. Such excessive pressure will necessitate heavier distributing conduits and larger and stronger fluid-utilizing devices than is necessary. This not only adds to the cost but to the weight, which is, of course, very important on airplanes.

Obviously, ordinary pressure-relief valves in the outlet lines cannot be used because they would interfere with the accuracy of flow division.

It is an object of the present invention to provide means for use in hydraulic systems employing flow dividers for limiting the pressure in any outlet line from the flow divider without disturbing the predetermined flow division.

Another object is to provide such a device including means controlled by the pressure in any outlet from a flow divider, which means serves to bleed the inlet line to the flow divider whenever the pressure in any outlet line therefrom reaches the desired maximum value.

Another object is to provide such pressure-limiting means in which there is a single valve for bleeding the inlet line, the effectivity of which valve is controlled by pilot valves which are controlled by the pressure in the respective outlet lines.

Another object is to provide pressure-limiting means in such a system in which the inlet line to the flow divider is throttled so that no bleeding from said line is necessary.

Another object is to provide pressure-limiting means in such a system in which the inlet line to the flow divider is throttled so that no bleeding from said line is necessary, said throttling means being controlled by pilot valves which are controlled by the pressure in their respective outlet lines.

Another object is to provide such pressure-limiting means making use of both throttling and bleeding.

Still another object is to provide such pressure limiting means making use of both throttling and bleeding, the pressure-limiting means being controlled by pilot valves which are controlled by the pressure in the respective outlet lines.

With the objects above indicated and other objects which will appear from the drawings and the following description, my invention consists in the construction and combination of elements hereinafter described and claimed.

Referring to the drawings:

Fig. 1 is a schematic illustration of a form of the device including two bleeder valves for bleeding the inlet line to a two-way flow divider under control of the pressure in their respective outlet lines from the flow divider;

Fig. 2 is a view similar to Fig. 1 of a modification in which a single bleeder valve is controlled by pilot valves;

Figure 4:
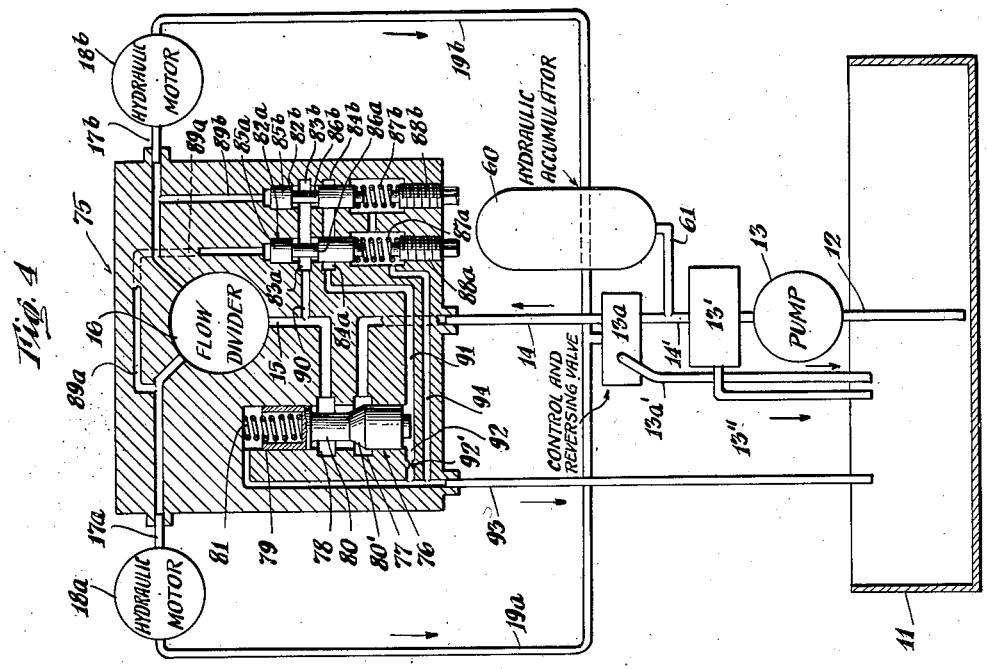
Fig. 4 illustrates another modification showing a throttling valve in the inlet line controlled by pilot valves which are controlled by the pressure in the respective outlet lines.

Fig. 5 shows another modification in which pressure control is effected by valves which throttle the inlet line and bleed the inlet line beyond the throttle, said pressure control means being operated under the control of pressure in their respective lines; and Fig. 6 illustrates another modification in which pressure control is effected by a single valve which throttles the inlet line and bleeds the inlet line beyond the throttle, said pressure control means being operated under the control of pilot valves which are under control of the pressure in the respective outlet lines.

Referring to Fig. 1, 11 indicates a sump containing a supply of fluid from which fluid may be drawn through conduit 12 by a pump 13 of any desired construction. 14 indicates the delivery line from said pump which communicates with conduit 15 which is the inlet line for the flow divider 16 of any desired construction. 17a and 17b are outlet conduits from the flow divider which supply fluid-utilizing means, such as hydraulic motors 18a and 18b. 19a and 19b indicate the return conduits from the hydraulic motors. 20 indicates generally a body which may contain the flow divider as well as the bleeder valves to be presently described. It is however to be understood that the flow divider may be a separate structure. The control valves may include cylindrical bores 21a and 21b which house slidable cylindrical valve pistons 22a and 22b formed, as shown, with a portion of reduced diameters 22a' and 22b'. They are normally held in the position shown by means of springs 23a and 23b respectively which bear against adjustable abutments 24a and 24b respectively. The upper ends of the cylindrical bores are connected by passages 25a and 25b with the outlet lines 17a and 17b respectively.

Near the center of the cylindrical bores are annular enlargements 26a and 26b which are connected through passages 27a and 27b with the inlet line 15.

The cylindrical bores are also provided with annular enlargements 28a and 28b which are connected to each other by the passage 29 and are connected through return line 30 with the sump. The conduit 29 is shown as connected to the space below the piston valves by passages 31a and 31b. These annular enlargements serve as valve ports and they, as well as other similar means, may on occasion be referred to as ports. In most cases a simple aperture in the wall of the cylinder bore would serve as well but, for manufacturing reasons, the use of annular enlargements is usually preferred.

The operation of this form of the invention is as follows:

The pump 13 delivers oil to the flow divider 16 through the control and reversing valve 13a and conduits 14 and 15. The fluid is divided by the flow divider and delivered through conduits 17a and 17b to the fluid-utilizing devices such as the hydraulic motors 18a and 18b. After leaving said motors the fluid is returned through conduits 19a and 19b through control and reversing valve 13a and conduit 13a' to the sump. The springs 23a and 23b have been adjusted to the maximum pressure desired in outlet conduits 17a and 17b. If, in the operation of the device, the pressure in one of the outlet lines as, for example, 17a, should exceed the desired maximum (due to an excessive load on motor 18a) the valve piston 22a will be moved downwardly against the bias of spring 23a sufficiently far to cause the reduced portion 22a' of the piston valve to align with the annular enlargement or port 28a. This will permit fluid to escape from the inlet line 15 through passage 27a into the cylindrical bore, thence into the annular port 28a and through return conduit 30 to the sump. As the amount of fluid which the pump 13 can deliver is limited, the pressure in the inlet conduit 15 will drop, causing a corresponding drop in pressure in the outlet conduit 17a. When this pressure drop has reached the desired value, the spring 23a will move the piston valve upwardly and thus shut off the flow from the inlet line 15.

Passages 31a and 31b are provided merely for the purpose of permitting the escape of any oil which may have leaked by the valve pistons and accumulated in the spring housing space.

The other valve means operates in the same manner under the control of pressure in outlet line 17b.

It will be seen that the construction described above will serve effectively to limit the pressure in either outlet line to a valve determined by the setting of the valve springs 23a or 23b, without disturbing the accuracy of flow division.

The form of device shown in Fig. 2 is an improvement over that of Fig. 1 in that only one bleeder valve is needed. The bleeder valves of the form shown in Fig. 1 must each be sufficiently large to bleed sufficient fluid from the system to keep the pressure in the system to a safe limit. In order to avoid providing one of these relatively large valves for each section of the flow divider, which would become expensive and bulky, particularly in a system including a flow divider having many sections, the form of Fig. 2 in which only one bleeder valve is needed, has been devised.

Referring to Fig. 2, the reference numerals 11, 12, 13, 13a, 13a', 14, 15, 16, 17a, 17b, 18a, 18b, 19a, and 19b refer to parts substantially identical with parts of the same number appearing in Fig. 1. The numeral 35 indicates generally a body which may contain the flow divider, the bleeder valve, and the pilot valves, to be presently described. This body is shown as provided with a cylindrical bore 36 containing a valve piston 37 normally pressed downwardly by a spring 38. It is formed with a reduced clearance portion 39 and preferably with a stroke-limiting projection 40. This valve bore is provided with an annular enlargement 41 which is connected through passage 42 with the inlet line 15. It is also provided with an annular enlargement 43 which is connected through passage 44 with a return conduit 45. The passage 46 connects the space above the piston with the return conduit 45 to permit the escape of any leakage oil. The space below the piston is connected to the return conduit 45 by means of a passage 47 which contains a restriction 47a therein.

Pilot valves for controlling the operation of the valve means 37 are shown as consisting of cylindrical bores 50a and 50b containing valve pistons 51a and 51b formed with central reduced portions 52a and 52b and normally pressed upwardly to the position shown by means of springs 53a and 53b, the bias of which may be adjusted by means of the threaded spring abutments 54a and 54b.

The valve bores 50a and 50b are formed with annular enlargements 55a and 55b which are connected together and through conduit 56 with the inlet line 15. The valve bores 50a and 50b are also provided with annular enlargements 57a and 57b which are connected together and are connected through conduit 58 with the space below the main bleeder valve piston 37. The space above the pistons 51a and 51b are connected with the outlet lines 17a and 17b respectively by means of passages 59a and 59b. The spaces below the valve pistons are connected to each other by passage 45' and to the conduit 45 by passage 45''.

The operation of the device of Fig. 2 is as follows:

The parts are normally in the position shown in which no bleeding from the inlet line 15 can take place. If, however, the pressure in one of the outlet lines, say the line 17a, should rise above the desired value, the valve piston 51a will be moved downwardly against the bias of spring 53a. When this occurs, fluid from inlet line 15 flows through passage 56 into the annular enlargement 57a into passage 58 under the bleeder valve piston 37, moving it upwardly until the reduced central portion 39 thereof aligns with the annular port 43. This permits fluid to pass from the inlet line 15 through passage 42, the annular enlargement 41, the port 43, passage 44, and return conduit 45, to the sump. This will immediately cause the pressure in the inlet line 15 to drop and therefore cause a corresponding drop in the outlet line 17a. This permits the valve piston 51a to rise under action of spring 53a shutting off the pressure to passage 58. The valve piston 36 will thereupon drop under action of spring 38.

During this time, fluid under the piston will leak through the restriction 47a to the return conduit 45. This fluid has come from the inlet line 15 and not from line 17a so that the accuracy of flow division will not be affected.

The other pilot valve 51b will operate in the same manner under control of pressure in the outlet line 17b. It will be seen therefore that this arrangement will serve to prevent excess pressure in either outlet line while not disturbing the accuracy of flow division and that this can be accomplished by a single bleeder valve irrespective of the number of sections in the flow divider. It is of course necessary to provide a pilot valve for each section of the flow divider but these valves may be made very small and inexpensive.

Figure 3:
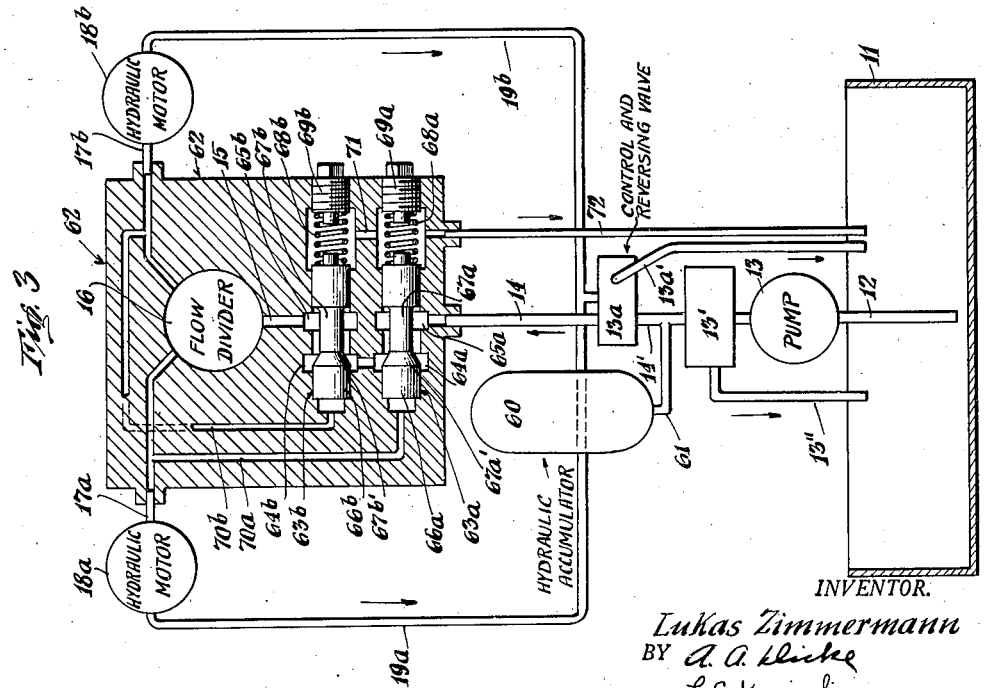
Fig. 3 illustrates another modification in which the inlet to the flow divider is throttled by valves controlled by pressure in the respective outlet lines.

The forms of the invention shown in Figs. 3 and 4 accomplish reduction of pressure in the inlet lines and therefore in the outlet lines, by throttling the supply of fluid to the inlet line rather than bleeding or bypassing some of the fluid. This method is preferable whenever the fluid is supplied from an accumulator as it avoids discharging of the accumulator if one of the hydraulic motors is stalled by overloading for any considerable period of time. This form of device is also useful where the fluid is supplied to the flow divider from a pump having automatic means for maintaining a predetermined pressure. In that connection, I have in mind a variable volume positive displacement pump, the delivery volume of which is decreased automatically upon the occurrence of increase in pressure.

If such a pump were used with the systems of Figs. 1 and 2 the pump would be automatically adjusted to increased volume upon the opening of the bleeder valve or valves in an effort to maintain the pressure. This would necessitate extremely large bleeder valves and result in a waste of energy.

Referring to Fig. 3, the reference numerals 11, 12, 13, 13a, 13a', 14, 15, 16, 17a, 17b, 18a, 18b, 19a, and 19b refer to parts substantially identical with parts of the same number appearing in Figs. 1 and 2. 13' represents an unloading valve of any known or suitable construction. Such valves cause the pump to be connected to deliver to the accumulator until pressure in the accumulator has reached the maximum desired value. Then it disconnects the pump from the line to the accumulator and connects the pump directly to the sump, as through line 13'' so that the pump will circulate fluid against only a very low pressure, thereby saving power. In the meantime, the system will be supplied from the accumulator. After the accumulator pressure has dropped to the lower pressure limit for which the unloading valve has been set, the unloading valve will again connect the pump to deliver liquid to the accumulator. 60 indicates a hydraulic accumulator connected through conduit 61 with the conduit 14. Instead of the relief valve 13' and the accumulator 60, the pump 13 may, if desired, be of the type having variable volume and means for controlling the volume inversely with the pressure in line 14' so that said pump will maintain a constant pressure in said line 14'. 62 indicates generally a body which may contain both the flow divider and the pressure control valves to be presently described although the valves and flow divider may, of course, be arranged separately. Said body is shown provided with cylindrical bores 63a and 63b having annular enlargements 64a, 64b, 65a, 65b. Said bores contain valve pistons 66a and 66b each formed with a reduced central portion 67a and 67b which are connected by conical portions 67a' and 67b' with the full diameter portions at the left end of said valve pistons.

Springs 68a and 68b normally hold said valve pistons to the left, as shown. Said springs may be set to the desired value by varying the position of the adjustable spring abutments 69a and 69b. The annular enlargement 65a is connected with the conduit 14 and the annular enlargement 65b is connected with the conduit 15 which is the inlet line for the flow divider. The annular enlargements 64a and 64b are connected with each other and normally the enlargement 64a is connected with the enlargement 65a and therefore with the conduit 14 whereas enlargement 64b is normally connected with the enlargement 65b and therefore with the conduit 15, thus establishing connection from the conduit 14 to the conduit 15. Passages 70a and 70b serve to connect the outlet lines 17a and 17b respectively with the spaces to the left of the pistons 66a and 66b, respectively. The spaces within which the springs 68a and 68b are housed are connected to each other by a passage 71 and a conduit 72 serves to drain any leakage collected in the spring space of either valve back to the sump.

The device of Fig. 3 operates as follows:

With the parts in the position shown, fluid will be delivered from the pump and/or accumulator to the flow divider where it is divided and transmitted to the fluid-utilizing devices such as the hydraulic motors 18a and 18b respectively. If now the pressure in one of the outlet lines, say 17a, should exceed the desired amount, the pressure therein will be conducted through passage 70a to the space to the left of valve piston 66a, causing said piston to move to the right against the bias of spring 68a. When the conical portion of the piston 66a approaches the limit of the annular enlargement 64a, it serves to throttle the fluid thereby reducing the fluid delivered to the flow divider and consequently the pressure in the passage 15 which is the inlet line to the flow divider. Drop in the inlet pressure will result in a corresponding drop of the outlet pressure in line 17a. When this occurs, the piston 66a will move to the left but will maintain a position which will assure that the pressure in line 17a can never exceed the one for which the spring 68a is adjusted. The other valve piston 66b will operate in the same manner under control of pressure in the line 17b. It will be noted that the two throttling valves are arranged in series so that either one can control the flow.

Fig. 4 illustrates a form of the invention in which a single pressure throttling valve is used, the effectivity of which is controlled through pilot valves by the pressure in the outlet lines of the flow divider.

Referring to Fig. 4, the numerals 11, 12, 13, 13a, 13a', 14, 15, 16, 17a, 17b, 18a, 18b, 19a, 19b, 13', 13'', 60, and 61 refer to parts substantially identical with parts of the same number appearing in Fig. 3. The numeral 75 indicates generally a body which may contain the flow divider as well as the pressure control valves although they may be arranged separately. 76 indicates a cylindrical bore therein provided with annular enlargements 77 and 78. In said bore is located a piston 79 having a reduced central portion 80 which is connected by a conical portion 80' with the full diameter lower portion of the valve piston. Said piston is normally held in its lowest position by means of a spring 81. The annular enlargement 77 is connected with the conduit 14 and is normally connected with the annular enlargement 78 which is connected to passage 15 which serves as the inlet line for the flow divider.

The body is shown as also formed with cylindrical bores 82a and 82b formed with annular enlargements 83a and 83b connected with each other and annular enlargements 84a and 84b connected with each other. Said bores contain valve pistons 85a and 85b respectively, said pistons being formed with central reduced portions 86a and 86b respectively. The pistons are normally held in the upper position shown by means of springs 87a and 87b, the bias of which may be varied by adjusting the adjustable spring abutment plugs 88a and 88b. The upper portions of the pilot valve bores are connected with outlet lines 17a and 17b by means of passages 89a and 89b respectively. The annular enlargements 83a and 83b are connected through passage 90 with the conduit 15 and the annular enlargements 84a and 84b are connected through conduit 91 with the space below the throttling valve piston 79. Said space is also connected through passage 92 having a restriction 92' with a return conduit 93 which is also connected to the space above the valve piston 79. Fluid accumulating below the pilot valve piston may escape through passages 94 and 93 to the sump.

The operation of the device of Fig. 4 is as follows:

The conduit 14 is normally connected to the conduit 15. However, if the pressure in one of the outlet lines as, for example, outlet line 17a, should rise above the predetermined value the pilot valve piston 85a will be moved downwardly, admitting pressure from line 15 into passage 91, causing the throttling valve piston 79 to rise. As the conical portion 80' thereof approaches the upper limit of the annular enlargement 77, it causes the fluid to be throttled, resulting in a reduction in pressure in the line 15 which is the inlet to the flow divider, and a corresponding drop in pressure in the outlet line 17a. This permits the pilot valve piston 85a to rise, shutting off the supply of fluid to conduit 91. The throttling valve piston 79 will thereupon drop under the action of spring 81 at a rate permitted by the restriction 92'. In this construction, as in that of Fig. 2, the fluid which drains away at this time, and for that matter during the time while the bottom of valve piston 79 is under pressure, is obtained from line 15 and the loss therefore does not interfere with the accuracy of flow division.

The action of the other pilot valve 85b is the same as described except that it occurs under control of the pressure in outlet line 17b.

The throttling methods of controlling the inlet pressure to the flow divider and thereby the outlet pressure, as shown in Figs. 3 and 4, have a certain disadvantage. Thus, in case of a reversed motion of the hydraulic motors or other fluid-utilizing means due to their being overpowered by an external force applied thereto, the rising pressure in the outlet line will close the throttling valves (66a or 66b in Fig. 3, or 79 in Fig. 4), thus trapping the fluid. This may result in damage to the driven mechanism or to the flow divider or cause bursting of conduits. This difficulty does not exist where a bleeding valve is used, as in Figs. 1 and 2, since under these circumstances the fluid may escape to the sump. The systems shown in Figs. 5 and 6 avoid the disadvantage I have referred to and combine the advantages of the bypass or bleeder type with those of the throttling type.

Referring to Fig. 5, the numerals 11, 12, 13, 13a, 13a', 14, 15, 16, 17a, 17b, 18a, 18b, 19a, 19b, 13', 13'', 60, and 61 refer to parts substantially identical with parts of the same number appearing in Fig. 3. 95 indicates generally a body which may contain both the flow divider and the pressure control valves to be presently described although the valves and flow divider may, of course, be arranged separately. Said body is shown as provided with cylindrical bores 96a and 96b, the bore 96a having annular enlargements 97a, 98a, 99a, and 100a, and the bore 96b having annular enlargements 97b, 98b, 99b, and 100b. Said bores contain valve pistons 101a and 101b respectively. The valve piston 101a is formed with reduced portions 102a and 103a whereas the piston 101b is formed with reduced portions 102b and 103b. The said reduced portions are preferably joined to their full-size terminal portions by the conical sections shown.

Springs 104a and 104b normally hold said valve pistons to the left, as shown. Said springs may be set to the desired value by varying the position of the adjustable spring abutments 105a and 105b. The annular enlargement 98a is normally connected with the annular enlargement 97a which is always connected to the annular enlargement 97b which is normally connected to the annular enlargement 98b which is always in communication with conduit 15 which is the inlet conduit to the flow divider. It will be seen therefore that there is normally an open communication between the conduit 14 and the conduit 15. The annular enlargements 99a and 99b are always connected and the annular enlargement 99b is connected to the conduit 15 by a passage 106. The annular enlargements 100a and 100b are connected together and the enlargement 100a is connected with the return conduit 107 leading to the sump. The spring spaces to the right of the valve pistons are connected by a drain passage 108 and are connected with the return conduit 107 by a drain passage 109. The left ends of the valve piston bores are connected by conduits 110a and 110b with the outlet lines 17a and 17b, respectively.

The device of Fig. 5 operates as follows:

With the parts in the position shown, fluid will be delivered from the pump and/or accumulator to the flow divider through conduits 14, ports 98a, 97a, 97b, and 98b through passage 15. The flow divider divides the flow which is transmitted to the fluid-utilizing devices 18a and 18b in predetermined proportions. If now the pressure in one of the lines, say 17a, should exceed the desired amount, the pressure therein will be conducted through passage 110a to the space to the left of valve piston 101a, causing said valve to move to the right against the bias of spring 104a. When this occurs, the conical portion to the left of the reduced section 102a approaches the limit of the annular recess 97a. This serves to throttle the fluid which would otherwise pass freely from the conduit 14 to the conduit 15. In so doing, it reduces the pressure in the inlet line 15 to the flow divider which results in a corresponding drop of the outlet pressure in line 17a. If the valve piston 101a should be moved still further, the conical portion to the right of the reduced section 103a of valve piston 101a begins to align with the annular recess 100a, thus opening a passage from inlet line 15 through passage 106, annular recess 99b, annular recess 99a, annular recess 100a, through return pipe 107 to the sump. This bleeding of the line 15 will permit reverse movement of the hydraulic motors 18a and 18b for reasons and under circumstances to be described presently. The "bleeding off" part of the valve does not begin to open until after the throttling part is entirely closed, so that at no time is there simultaneous throttling and bleeding. It depends upon the nature of the load on the hydraulic motors whether the pressure is controlled by the throttling part of the valve or by the bleeding off part of the valve. If for example the load is purely of the friction type, and this load exceeds the permissible value the hydraulic motors will merely stall, and there is no danger of the hydraulic motors being reversed by their load and under this condition the pressure will be controlled entirely by the throttling part of the valve. However, if the external load is of such a nature that it is capable of overpowering and reversing the hydraulic motors, as for example in case of wind pressure acting upon the wing flaps of an airplane, the throttling will give control of the pressure in the flow divider outlet lines only as long as the flaps are not reversed. Whenever the flaps meet with an excessive wind pressure such as may be caused by gusts of wind or by flying at too high a rate of speed, with the flaps down, the pressure in the outlet lines is caused by the reversed motion of the hydraulic motor or cylinder and it is at this time that the valve is moved beyond the throttling position into the bleeding off position. This provides a very important safety factor. The valve parts may be so proportioned and the springs so set that the flaps will be moved to or held in their effective position only to an extent consistent with the strength of the flaps and other parts of the plane. Thus the pilot may set the usual manually operated control valve 13a for full flap application irrespective of his speed. If the speed should be so high that the stress on the flaps and connected parts might become excessive the hydraulic motor 18a and/or 18b or other fluid utilizing device will be reversed by such external overpowering force. The liquid entrapped in line 110a and/or 110b will then force the valve piston 101a and/or 101b sufficiently far to the right to permit the escape of liquid at 100a and/or 100b. This permits the flow divider to rotate reversely so that the flaps will automatically assume a position where the stresses generated in the flaps and in the plane are not excessive. It will also be noted that the action of an overpowering force on only one wing flap will open both wing flaps to recede together.

When a drop in pressure occurs, the valve piston 101a will again move to the left under the action of spring 104a and restore the normal condition or assume such intermediate position as may be required by the forces acting upon the hydraulic motor 18a. The other valve piston 101b will operate in the same manner under control of pressure in line 17b. It will be noted that the two throttling sections of the valves are arranged in series so that either one can effect throttling, whereas, the two bleeder sections of the valves are arranged in parallel so that when either is open a reversal of the hydraulic motors and the flow divider can be effected.

Fig. 6 illustrates a form of the invention in which both throttling and bleeding are used as in the case of Fig. 5, the throttling and bleeding being however effected by a single valve which is controlled by pilot valves which are responsive to the pressure in the respective outlet lines.

Referring to Fig. 6, the numerals 11, 12, 13, 13a, 13a', 14, 15, 16, 17a, 17b, 18a, 18b, 19a, 19b, 13', 13", 60, and 61 refer to parts substantially identical with parts of the same number appearing in Fig. 5. The numeral 115 indicates generally a body which may contain the flow divider as well as the pressure control valves, although they may be arranged separately. 116 indicates a cylindrical bore therein provided with annular enlargements 117, 118, and 119. In said bore is located a piston 120 having a central reduced portion 121, a conical section 122 connecting said reduced portion with the lower full diameter portion of the piston and having a conical section 123 connecting the reduced portion with the upper full diameter section of the piston. The lower end of the piston is shown as provided with a projection 124 to limit downward movement of the piston. A spring 125 tends to press the piston downwardly.

The conduit 14 is connected with the annular enlargement 117 which is normally connected with the annular enlargement 118 which is in communication with conduit 15 which is the inlet to the flow divider. The annular enlargement 119 is always in communication with the return conduit 126. A passage 127 connects the space above the piston in which the spring is housed to the return conduit 126.

The body is also formed with two cylindrical bores 130a and 130b, the upper ends of which are connected by passages 131a and 131b with the outlet lines 17a and 17b respectively. Said cylindrical bores are formed with annular enlargements 132a and 132b respectively, which enlargements are connected to each other and through passage 133 to the conduit 15. Said bores also contain annular enlargements 134a and 134b which are connected to each other and through passage 135 to the space below the valve piston 120.

Said cylindrical bores 130a and 130b contain respectively valve pistons 136a and 136b which are formed with central reduced portions. The pistons are normally held in the upper position shown by means of springs 137a and 137b, the bias of which may be varied by adjusting the adjustable spring abutment plugs 138a and 138b respectively. Any fluid accumulating under the pistons in the spring housings may be freed by connecting the two spaces to each other and through conduit 139 with the return conduit 126. A passage 140 having a restriction 141 therein connects the space below the valve piston 120 with the return conduit 126.

The operation of the device of Fig. 6 is as follows:

The conduit 14 is normally connected to the conduit 15 through annular enlargements 117 and 118. However, if the pressure in one of the outlet lines, as for example outlet line 17a, should rise above the predetermined value for which the spring 137a has been set the pilot valve piston 136a will be moved downwardly. This admits fluid under pressure from line 15 through passage 133, annular enlargements 132a and 134a, and conduit 135, to the space below the valve piston 120, causing said piston to rise. In so doing, the conical section 122 thereof approaches the limit of the annular enlargement 117, thus throttling the flow of fluid from line 14 to line 15. If the valve piston should be moved still further, the conical section 123 of the valve piston 120 reaches the annular enlargement 119 and thereby permits fluid from line 15 to be bled to the return line 126. This may occur under the conditions described hereinabove with respect to the operation of the form shown in Fig. 5. Upon the occurrence of a drop in pressure, the pilot valve piston 136a rises either to its upper position or to such an intermediate position as the conditions imposed upon hydraulic motor 18a may determine. As the pilot valve piston 136a rises, the main valve piston 120 drops at a rate determined by the restriction 141.

The six illustrative forms of the invention described above have the common characteristic that they will prevent development of a pressure in any of a plurality of outlet lines from a flow divider (and a corresponding excessive torque or force in a fluid-utilizing device connected therewith), the pressure limiting being controlled by the pressure existing in any outlet line (irrespective of the pressure in the other outlet lines), and said pressure limiting means accomplishes its purpose without destroying the accuracy of flow division.

The illustrative forms shown in Figs. 1, 2, 5, and 6 have in common the characteristic that if reverse flow should occur through overpowering of the fluid-utilizing device, by an external force escape of the fluid is provided for to prevent the development of excessive pressures, in the system and excessive stresses in the device operated thereby.

It will be noted that the constructions shown and described will serve admirably to accomplish the objects stated above. It is to be understood, however, that the constructions disclosed above are intended merely as illustrative of the invention and not as limiting, as various modifications therein may be made without departing from the invention as defined by a proper interpretation of the claims which follow.

I claim:

1. In a hydraulic system, a source of fluid under pressure, a flow divider having an inlet conduit to which fluid is supplied from said source, a plurality of outlet conduits from said flow divider, and a plurality of fluid-utilizing means one connected to each of said fluid outlets; the combination on a valve comprising means controlled by the pressure in any of said outlet conduits serving upon occurrence of a predetermined pressure in any outlet conduit to reduce the pressure in the inlet to the flow divider.

2. In a hydraulic system having a source of fluid under pressure, a flow divider having an inlet conduit to which fluid is supplied from said source and a plurality of outlet conduits from said flow divider and a plurality of fluid-utilizing means, the combination of a valve controlled by the pressure in any of said outlet conduits serving upon occurrence of a predetermined pressure in any outlet conduit to reduce the pressure in the inlet to the flow divider by bleeding fluid from said inlet conduit.

3. In a hydraulic system, a source of fluid under pressure, a flow divider having an inlet conduit to which fluid is supplied from said source, a plurality of outlet conduits from said flow divider, and means controlled by the pressure in any of said outlet conduits serving upon occurrence of a predetermined pressure in any outlet conduit to reduce the pressure in the inlet to the flow divider by throttling the conduit leading from the pressure source to the flow divider.

4. In a valve adapted for use in a hydraulic system having a source of fluid under pressure, a flow divider having an inlet conduit to which fluid is supplied from said source, and a plurality of outlet conduits from said flow divider; said valve comprising means controlled by the pressure in any of said outlet conduits serving upon occurrence of a predetermined pressure in any outlet conduit to reduce the pressure in the inlet to the flow divider by throttling the conduit leading from the pressure source to the flow divider, and bleeding fluid from said inlet conduit upon the occurrence of a higher pressure in said outlet conduit, as by the action of an external force upon said fluid-utilizing means.

5. In a hydraulic system, a source of fluid under pressure, a flow divider having an inlet conduit to which fluid is supplied from said source, a plurality of outlet conduits from said flow divider, and a plurality of valve means, one associated with each of said outlets, each controlled by the pressure in its associated outlet conduit and each so constructed and arranged that upon occurrence of a predetermined pressure in its associated outlet conduit it will reduce the pressure in the inlet to the flow divider.

6. In a valve adapted for use in a hydraulic system having a source of fluid under pressure, a flow divider having an inlet conduit to which fluid is supplied from said source, and a plurality of outlet conduits from said flow divider; said valve comprising a plurality of valve bodies, one associated with each of said outlets, each controlled by the pressure in its associated outlet conduit and each so constructed and arranged that upon occurrence of a predetermined pressure in its associated outlet conduit it will reduce the pressure in the inlet to the flow divider by causing fluid to be bled from said inlet conduit.

7. In a hydraulic system, a source of fluid under pressure, a flow divider having an inlet conduit to which fluid is supplied from said source, a plurality of outlet conduits from said flow divider, and a plurality of valve means, one associated with each of said outlets, each controlled by the pressure in its associated outlet conduit and each so constructed and arranged that upon occurrence of a predetermined pressure in its associated outlet conduit it will reduce the pressure in the inlet to the flow divider by causing the conduit leading from the pressure source to the flow divider to be throttled.

8. In a hydraulic system, a source of fluid under pressure, a flow divider having an inlet conduit to which fluid is supplied from said source, a plurality of outlet conduits from said flow divider, and a plurality of valve means, one associated with each of said outlets, each controlled by the pressure in its associated outlet conduit and each so constructed and arranged that upon occurrence of a predetermined pressure in its associated outlet conduit it will cause the pressure in the inlet to the flow divider to be reduced by throttling the conduit leading from the pressure source to the flow divider, and upon the occurrence of a higher pressure in its associated outlet conduit will bleed fluid from said inlet conduit.

9. In a hydraulic system, a source of fluid under pressure, a flow divider having an inlet conduit to which fluid is supplied from said source, a plurality of outlet conduits from said flow divider, a single pressure reducing valve and a plurality of pilot valves, one associated with each of said outlets, each controlled by the pressure in its associated outlet conduit and each so constructed and arranged that upon occurrence of a predetermined pressure in its associated outlet conduit it will actuate the said pressure reducing valve to reduce the pressure in the inlet to the flow divider.

10. In a hydraulic system, a source of fluid under pressure, a flow divider having an inlet conduit to which fluid is supplied from said source, a plurality of outlet conduits from said flow divider, a single pressure reducing valve and a plurality of pilot valves, one associated with each of said outlets, each controlled by the pressure in its associated outlet conduit and each so constructed and arranged that upon occurrence of a predetermined pressure in its associated outlet conduit it will actuate the said pressure reducing valve to reduce the pressure in the inlet to the flow divider, by bleeding fluid from said inlet conduit.

11. In a hydraulic system, a source of fluid under pressure, a flow divider having an inlet conduit to which fluid is supplied from said source, a plurality of outlet conduits from said flow divider, a single pressure reducing valve and a plurality of pilot valves, one associated with each of said outlets, each controlled by the pressure in its associated outlet conduit and each so constructed and arranged that upon occurrence of a predetermined pressure in its associated outlet conduit it will actuate the said pressure reducing valve to reduce the pressure in the inlet to the flow divider by throttling the conduit leading from the pressure source to the flow divider.

12. In a hydraulic system of the type in which fluid under pressure is supplied to a flow divider having an inlet conduit and a plurality of outlet conduits, a single pressure reducing valve and a plurality of pilot valves, one associated with each of said outlets, each controlled by the pressure in its associated outlet conduit and each so constructed and arranged that upon occurrence of a predetermined pressure in its associated outlet conduit it will actuate the said pressure reducing valve to reduce the pressure in the inlet to the flow divider by throttling the conduit leading from the pressure source to the flow divider, and upon the occurrence of a higher pressure in its associated outlet conduit will bleed fluid from said inlet conduit.

13. In a hydraulic system, a source of fluid under pressure, a flow divider having an inlet conduit to which fluid is supplied from said source, a plurality of outlet conduits from said flow divider, a plurality of valve pistons, one associated with each of said outlets, each of said pistons being slidably positioned in a bore formed with at least one port, spring means for normally holding said piston at one end of its stroke, said piston being so formed that said port is normally closed and that said port is opened when the piston is moved against the bias of said spring means, conduits leading from the port of each of said valves to the fluid supply conduit and to a discharge conduit, conduits leading from each of said outlet conduits to its associated valve bore and serving to transmit the pressure in its outlet to its associated valve piston to move it against the bias of its spring, whereby upon occurrence of a predetermined pressure in its associated outlet conduit the respective valve will reduce pressure in the inlet to the flow divider by bleeding fluid from said inlet conduit.

14. In a hydraulic system, a source of fluid under pressure, a flow divider having an inlet conduit to which fluid is supplied from said source, a plurality of outlet conduits from said flow divider, a plurality of valve pistons, one associated with each of said outlets, each of said pistons being slidably positioned in a bore formed with at least one port, spring means for normally holding said piston at one end of its stroke, said piston being so formed that said port is normally open and that said port is gradually closed when the piston is moved against the bias of said spring means, conduits leading from the port of one of said valves to the fluid supply conduit and to the port of the other valve and from said other valve port to the inlet conduit, conduits leading from each of said outlet conduits to its associated valve bore and serving to transmit the pressure in its outlet to its associated valve piston to move it against the bias of its spring, whereby upon occurrence of a predetermined pressure in its associated outlet conduit the port of the respective valve will be closed and the pressure in the inlet to the flow divider will be reduced by throttling the fluid supplied to said inlet conduit.

15. In a hydraulic system, a source of fluid under pressure, a flow divider having an inlet conduit to which fluid is supplied from said source, a plurality of outlet conduits from said flow divider, a plurality of valve pistons, one associated with each of said outlets, each of said pistons being slidably positioned in a bore formed with at least one port, spring means for normally holding said piston at one end of its stroke, said piston being so formed that said port is normally closed and that said port is gradually opened when the piston is moved against the bias of said spring means, conduits leading from the port of each of said valves to the fluid supply conduit and to a discharge conduit, conduits leading from each of said outlet conduits to its associated valve bore and serving to transmit the pressure in its outlet to its associated valve piston to move it against the bias of its spring, whereby upon occurrence of a predetermined pressure in its associated outlet conduit the port of the respective valve will be opened and the pressure in the inlet to the flow divider will be reduced by bleeding fluid from said inlet conduit.

16. In a hydraulic system having a source of fluid under pressure a flow divider having an inlet conduit and a plurality of outlet conduits and a plurality of fluid-utilizing means one connected to each of said fluid outlets, the combination of valve means controlled by the pressure in either outlet conduit so constructed and arranged that upon occurrence of a predetermined pressure in one of the outlet conduits said valve means will reduce the pressure in the inlet to the flow divider by bleeding fluid from said inlet conduit.

17. In a hydraulic system having a source of fluid under pressure a flow divider having an inlet conduit and a plurality of outlet conduits and a plurality of fluid-utilizing means one connected to each of said fluid outlets, the combination of valve means controlled by the pressure in either outlet conduit so constructed and arranged that upon occurrence of a predetermined pressure in one of the outlet conduits said valve means will reduce the pressure in the inlet to the flow divider by throttling the conduit leading from the pressure source to the flow divider.

18. In a hydraulic system, a source of fluid under pressure, a flow divider having an inlet conduit to which fluid is supplied from said source, a plurality of outlet conduits from said flow divider, valve means controlled by the pressure in either outlet conduit so constructed and arranged that upon occurrence of a predetermined pressure in one of the outlet conduits said valve means will reduce the pressure in the inlet to the flow divider by throttling the conduit leading from the pressure source to the flow divider, and upon the occurrence of a higher pressure will bleed fluid from said inlet conduit.

19. In a hydraulic system, a source of fluid under pressure, a flow divider having an inlet conduit to which fluid is supplied from said source, a plurality of outlet conduits from said flow divider, a single spring-biased pressure reducing valve and a plurality of pilot valves, one associated with each of said outlets, each controlled by the pressure in its associated outlet conduit and each so constructed and arranged that upon occurrence of a predetermined pressure in its associated outlet conduit it will actuate the said pressure reducing valve against the bias of its spring to throttle the conduit leading from the pressure source to the flow divider, whereby the pressure in the inlet to the flow divider is reduced, and upon a further increase in pressure in said outlet to further actuate said pressure reducing valve to bleed fluid from said inlet conduit to permit reverse movement of said fluid-utilizing means.

LUKAS ZIMMERMANN.

REFERENCES CITED

The following references are of record in the file of this patent:

UNITED STATES PATENTS

| Number | Name | Date |
|---|---|---|
| 1,968,700 | Milotta | July 31, 1934 |
| 2,028,766 | Ernst | Jan. 28, 1936 |
| 2,214,817 | Harrington | Sept. 17, 1940 |
| 2,365,095 | Miller | Dec. 12, 1944 |
| 2,368,852 | Lauck | Feb. 6, 1945 |
| 2,374,630 | Tucker | Apr. 24, 1945 |